May 3, 1955 — W. J. VOSS — 2,707,652
LOCKING DEVICE FOR REAR GATE ON TRUCKS
Filed Sept. 24, 1953 — 2 Sheets-Sheet 1
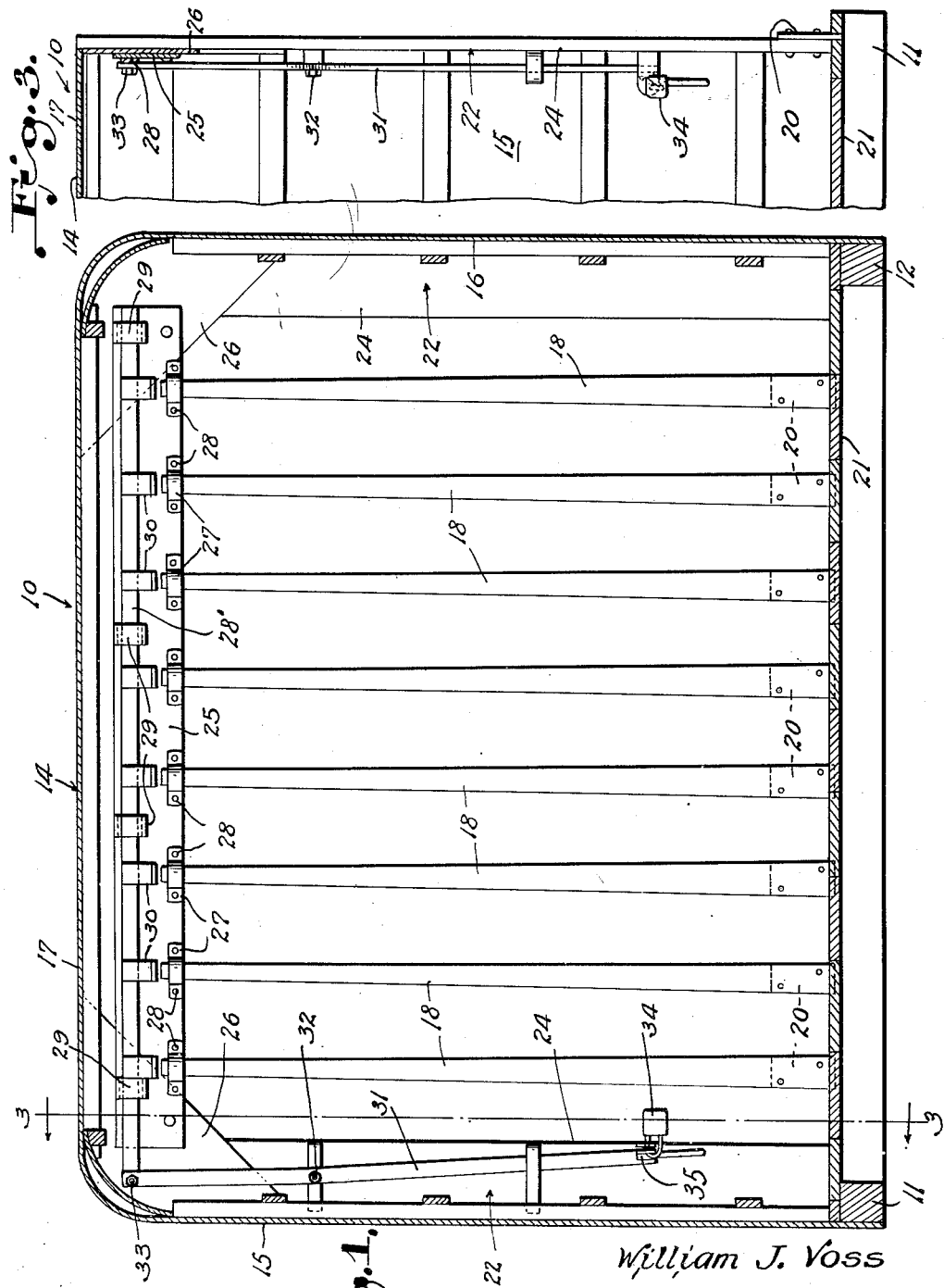
William J. Voss
INVENTOR

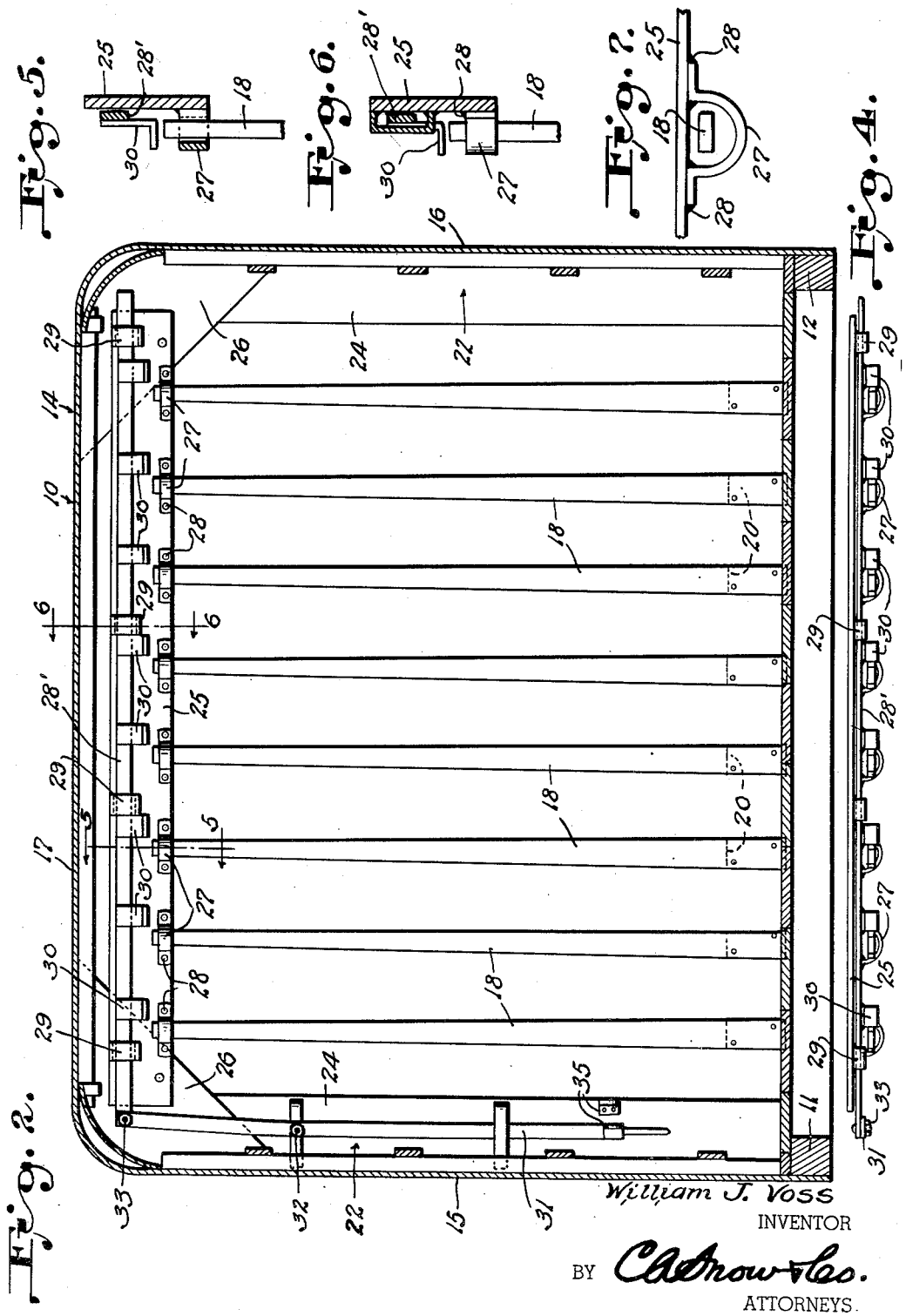

United States Patent Office

2,707,652
Patented May 3, 1955

2,707,652

LOCKING DEVICE FOR REAR GATE ON TRUCKS

William J. Voss, St. Louis, Mo.

Application September 24, 1953, Serial No. 382,137

3 Claims. (Cl. 296—43)

This invention relates to a locking device for securing the stakes of a stake truck or the sides or end walls of a truck having staked sides or end walls in a truck or other van.

It is an object of this invention to provide a stake engaging means for a stake truck or other staked van engageable with the ends of the stakes for properly positioning the stakes relative to the sides and rear or bottom of the truck or van and means for locking the stake engaging means in said truck or van and thereby securing the stakes and any material on the truck between the stakes against burglarly or inadvertent movement from the stakes.

It is another object of this invention to provide a stake engaging means for a stake truck or other van having staked walls engageable with the ends of the stakes remote from their lower ends which are engageable in the floor of a truck for securing the stakes in proper parallel position to each other and in proper upstanding relation to the bottom of the truck and locking the stakes against unauthorized removal from their positions thereby providing access for removal of the stakes or material confined on the truck or van between the stakes.

It is a principal object of this invention to provide a plurality of stakes for closing the rear end of a truck as a gate or a door and having means for locking the stakes in position for closing the rear end of the truck for preventing unauthorized removal of articles in or on the truck between the side walls of the truck and the stakes.

Other and further objects and advantages of the invention will be hereinafter described and the novel features thereof defined in the appended claims.

In the drawings:

Figure 1 is a transverse sectional view of a truck showing, in plan elevation, the stakes in their locked position closing the rear, open end of the truck.

Fig. 2 is a transverse sectional view, as in Fig. 1, the stakes being shown in plan view and in an unlocked position.

Fig. 3 is a fragmentary longitudinal section view of the truck taken on the line 3—3 of Fig. 1.

Fig. 4 is a fragmentary, detailed, sectional view of the truck showing the upper ends of the stakes with the locking means in its stake locking position.

Fig. 5 is a fragmentary, detailed section taken on the line 5—5 of Fig. 2.

Fig. 6 is a fragmentary, enlarged, detailed sectional view taken on the line 6—6 of Fig. 2.

Fig. 7 is an enlarged plan view showing the guide means for the upper end of the stakes.

Referring to the drawings the numeral 10 designates the body of a truck supported on suitable frame members 11 and 12, carried by the chassis of the truck and supporting a body 14 on the rear end of the truck. The rear end of the body 14 is provided with side walls 15 and 16 having a top wall 17 open at the rear end thereof. In place of a door or a gate for closing the rear end of the open truck body 14 there is provided a plurality of stakes 18 which are secured at their lower end to the bottom 21 adjacent the rear end thereof.

The lower end of each of the stakes 18 is provided with a metal reinforcing plate 20 depending from the stakes and extending outwardly from the bottom wall 21 of the truck body 14. The stakes 18 are thus detachably secured to the bottom wall 21 and when in proper place the stakes are secured in upstanding relation to the truck body 14 and in parallel spaced apart position as shown in Figs. 1 and 2 of the drawings.

A supporting frame 22 includes side, upstanding, supporting members 24 secured at their lower end to the floor or deck 21. The side truck body walls 15 and 16 are secured to the outer side of the open rear end of the truck body 14 and are secured together at their upper end by means of a cross brace 25. A gusset 26 provides for the secure connection of the cross member 25 to the upper ends of the side supporting members 24 and provides a support for the upper ends of the stakes 18. A plurality of U-shaped channel members 27 are secured along the length of the cross bar 25, in spaced apart relation for slidably receiving the extreme upper ends of the stakes 18. The guide members 27 may be secured, as by welding 28, or other suitable fastening means to the rear frame 22. For securing the stakes 18 in their proper, parallel position each of the stakes is slid initially upwardly into the channel members 27 and then the lower end of the stakes is properly positioned on the bottom 21 for engaging the lower end of the reinforcing plate 20 between the bottom wall 21 and the extreme rear end of the bottom of the truck body 14. When the stakes are properly positioned at their lower ends in relation to the bottom 21 of the truck body the upper ends of the respective stakes will be positioned in each of the guide members 27 on the cross bar 25. This positioning of the stakes 18 relative to the bottom wall 21 and the side walls 15 and 16 will support the stakes against inadvertent sliding movement for closing the open rear end of the truck body 14. For securing the stakes 18 in this open end of the truck body 14, there is provided a locking means engageable with the extreme upper end of each of the stakes 18 for securing the stakes against accidental or inadvertent vertical movement of the stakes 18 thereby preventing removal of the stakes from the truck and also removal of the stakes and then any material confined within the side walls 15 and 16 and the bottom through the open rear end of the truck body 14.

The locking means includes a locking bar 28' which is supported on the horizontal supporting bar 25 for reciprocable movement. Guide members 29 are fixedly secured to the upper rear frame member 25, on the inside thereof, and the locking bar 28' is reciprocably mounted therein. A plurality of locking devices, L-shaped in configuration, are carried by the locking bar 28' in spaced apart relation along the length of the locking bar 28'. Each of the locking elements 30 is L-shaped in configuration, and is clearly shown in Figs. 5 and 6 of the drawings. One arm of the L-shaped locking device 30 is fixed to the locking bar 28' and the other arm of the locking device extends inwardly of the truck for engaging the extreme upper end of each of the stakes 18 to prevent accidental or inadvertent vertical movement of each of the stakes 18. The locking bar 28' is moved, when desired, by a locking lever 31 from and into locking engagement with the stakes 18. The locking lever is pivotally mounted on the inside surface of one of the upstanding side frame members, as the frame member 24, and the extreme upper end of the lever 31 is pivotally mounted to one end of the locking bar 28' by a pivot pin 33.

When the locking bar 28' has been moved to its locking position by the movement of the locking lever 31 inwardly of the truck, the locking lever 31 may be locked in its locking position by means of a padlock 34 secured in the hasps 35 carried by the locking lever 31, adjacent its lower end, and the side frame support 24 which also carries the pivot 32 for the levers 31.

When it is desired to remove any one, or a plurality of stakes 18, the locking bar 28' is moved to its unlocking position as shown in Fig. 2 of the drawings and suitable ones of the stakes 18 may be removed for removing material from the floor 21 or other objects confined within the rear open ended body 14. When it is desired to lock and close the rear end of the body 14, suitable stakes 18 are again placed in their proper parallel position on the bottom 21 of the truck and the locking member 28', carrying the locking elements 30 is moved to the locking position as shown in Fig. 1 of the drawings and the lower end of the locking lever 31 is secured by the padlock 34 to thereby prevent any unauthorized removal of the stakes 18 and the material being transported within the open ended truck body 14.

While the specific details have been herein shown and described, the invention is not confined thereto and changes and alterations may be made without departing from the spirit thereof as defined in the appended claims.

I claim:

1. In a truck having a bottom, an upstanding open sided frame secured to said bottom including side frame members and a cross bar connected to said side frame members, a plurality of stakes removably engaged with said bottom, a plurality of spaced apart U-shaped members secured to said cross bar and slidably engageable with said stakes adjacent their upper ends, a locking bar slidably mounted on said cross bar, guide members secured on said cross bar in which said locking bar is slidably secured, spaced apart L-shaped locking members having one arm fixed on said locking bar with the other arm engageable with the upper end of each of said stakes for securing said stakes on said bottom, and lever means pivotally connected to said locking bar for sliding said locking bar in said guide means.

2. In a truck having a body open at the rear end, a bottom on said truck body, stake receiving means on said bottom for receiving the lower end of a plurality of stakes, a frame secured to said bottom including a pair of upstanding side frame members, an upper cross bar spaced from said bottom and secured at the upper ends of said side frame members, a plurality of spaced apart guide members secured on said cross bar for receiving the upper ends of said stakes, a locking bar slidably mounted on said cross bar for horizontal sliding movement, locking members on said locking bar movable into locking engagement with the upper ends of said stakes and locking means for securing said locking bar and said locking members in locking position.

3. In a truck as set forth in claim 2 wherein said locking means includes a lever pivotally mounted intermediate the length thereof on one of said side frame members and pivotally mounted at one end to one end of said locking bar, and locking means for securing the other end of said lever to said one side frame member.

References Cited in the file of this patent
UNITED STATES PATENTS

| | | |
|---|---|---|
| 939,315 | Pries | Nov. 9, 1909 |
| 2,543,143 | Wells | Feb. 27, 1951 |